Aug. 16, 1932.    R. B. STUCKEY    1,872,522
METHOD OF MAKING ARTIFICIAL STONE BRICK
Filed Oct. 2, 1930    2 Sheets-Sheet 1
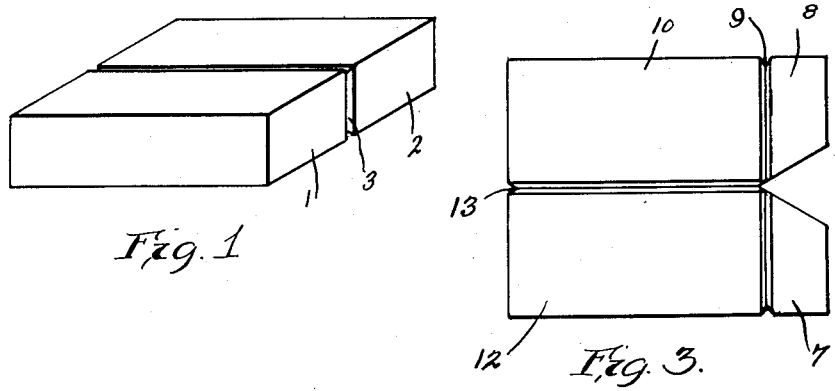
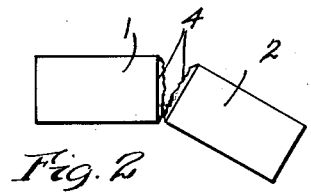
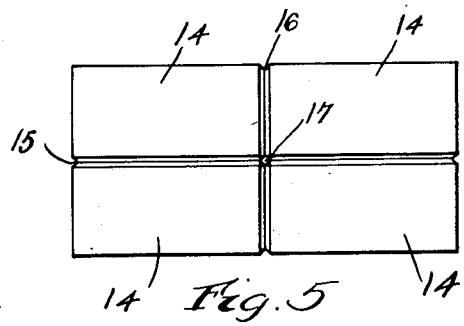
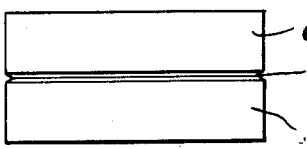
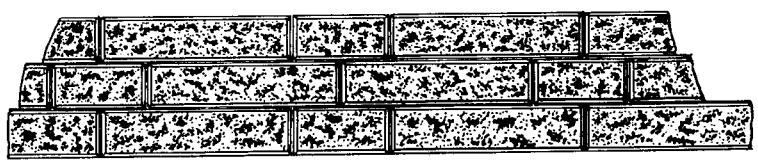
INVENTOR.
Robert B. Stuckey
BY
Fay, Oberlin & Fay
ATTORNEYS.

Aug. 16, 1932.  R. B. STUCKEY  1,872,522
METHOD OF MAKING ARTIFICIAL STONE BRICK
Filed Oct. 2, 1930  2 Sheets-Sheet 2
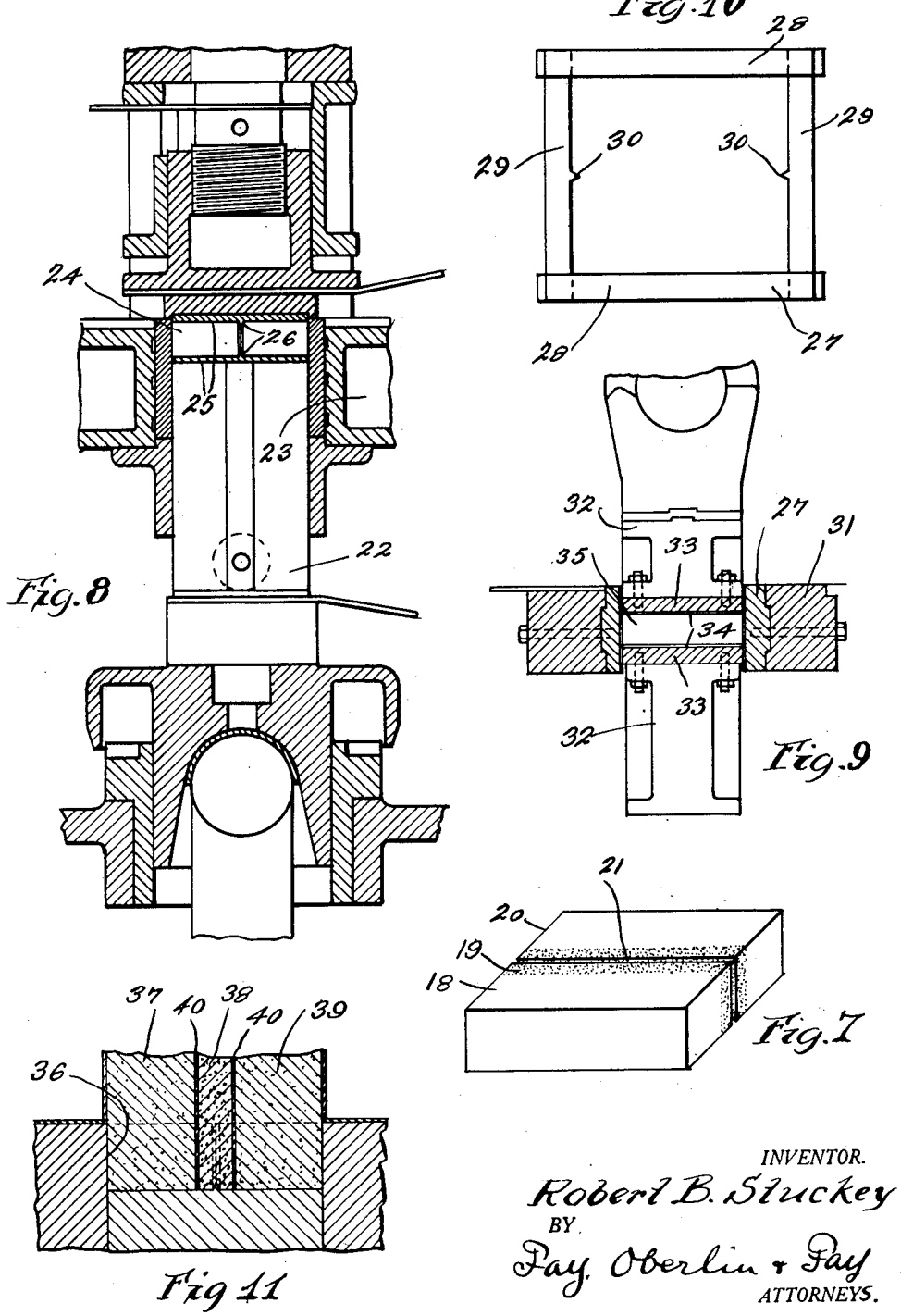

Patented Aug. 16, 1932

1,872,522

UNITED STATES PATENT OFFICE

ROBERT B. STUCKEY, OF BUCYRUS, OHIO, ASSIGNOR TO W. A. RIDDELL COMPANY, OF BUCYRUS, OHIO, A CORPORATION OF OHIO

METHOD OF MAKING ARTIFICIAL STONE BRICK

Application filed October 2, 1930. Serial No. 485,932.

This invention relating, as indicated, to artificial stone brick and the method of making same, has specific reference to the manufacture of building materials such as bricks which, for the purpose of enhancing their appearance, are usually provided with a decorative face which will be exposed when such bricks or blocks are laid up in the form of a wall, or the like. It will be noted, however, that the principles comprising this invention are equally applicable to the manufacture of blocks other than those which are usually referred to as brick and which are restricted in their use to the building of walls, and the like.

One of the chief means usually resorted to to enhance the appearance of a finished brick wall is to provide the exposed surface of such bricks with a contour closely resembling that of broken stone so that the finished structure will most closely approach in appearance a structure made from natural materials. Heretofore all efforts to produce a broken stone finish on the exposed faces of bricks and building blocks has been to press such blocks in a mold which has one of the plates therein formed with an irregular contour so that a like contour is imparted to the finished product. All of the bricks and blocks resulting from this method of manufacture have been very poor imitations of a broken stone face, and accordingly have been highly unsatisfactory for the purpose for which they have been designed. By employing the method comprising my invention, it is possible to manufacture an artificial building block or brick which has one or more faces thereof of a true broken stone appearance due to the fact that this method contemplates employing the plane of fracture of the material from which the blocks are made as the decorative face of such blocks. Consequently the finished product will more closely resemble a broken stone face than any of the products made in accordance with the methods heretofore employed. Further, by employing the principles comprising my invention, it is possible to manufacture such blocks of improved quality at a cost which is much lower than the cost of any methods which have heretofore been employed.

The use of rock finish bricks or blocks is not restricted entirely to building wall installations, but may be used advantageously as a paving surface, especially on steep grades, to provide a rough finish which will enable self-propelled vehicles to negotiate such grades without a slippage of the traction wheels thereof, which would result if such grades were paved with a smooth surface.

While the principles of this invention will be described as particularly applicable to the manufacture of bricks having a decorative broken stone face, it will be understood that such blocks may be employed for paving purposes with advantages not presented by any forms of construction previously employed.

For certain construction installations where highly decorative and sometimes colored effects are desired, it is desirable to have, in addition to the rough stone face of the block, a colored or otherwise decorative face which can be accomplished only by providing a veneer on the face of the block or brick. The principles comprising my invention are equally applicable to the manufacture of such a veneered brick and the resultant product will likewise be far superior to any heretofore made. It is among the objects of this invention to provide a method of making a brick or building block which shall have all of the above-named desirable characteristics. Other objects of my invention will appear as the description proceeds.

To the accomplishment of the foregoing and related ends, said invention, then, consists of the means hereinafter fully described and particularly pointed out in the claims, the annexed drawings and the following description setting forth in detail one method and one product exemplifying my invention, such disclosed procedure and product constituting, however, but one of various applications of the principles of my invention.

In said annexed drawings:

Fig. 1 is an isometric view of the molded or similarly formed slab from which the bricks comprising my invention are made; Fig. 2 is an end elevational view of the slab illustrated in Fig. 1, showing such slab broken to produce the decorative face on the separate bricks; Figs. 3, 4 and 5 are plan views of alternative forms of slabs which may be employed in the making of the brick comprising this invention; Fig. 6 is a fragmentary elevational view of a wall laid up from bricks comprising my invention; Fig. 7 is an isometric view of a slab employed in the manufacture of rock face bricks having a layer of veneer on the decorative face; Fig. 8 is a fragmentary part sectional, part elevational view of an apparatus adapted to be employed in the manufacture of slabs such as are illustrated in Figs. 1 to 5; Fig. 9 is a fragmentary part sectional, part elevational view of an alternative form of mechanism adapted to accomplish the same results as the mechanism illustrated in Fig. 8; Fig. 10 is a plan view of a mold such as is employed in the apparatus illustrated in Fig. 9; and Fig. 11 is a fragmentary sectional view of apparatus adapted to be employed in connection with the manufacture of the slab such as is illustrated in Fig. 7.

Referring more specifically to the drawings and more particularly to Fig. 1, the method of making bricks having a decorative broken stone surface on at least one side thereof is illustrated in the simplest manner in which it may be accomplished and consists of a slab which has a volume preferably the multiple of the volume of separate bricks or blocks such as 1 and 2. The slab as initially formed is provided with a peripheral groove or score 3 which defines the plane of fracture between the bricks 1 and 2 as the same are broken apart, as most clearly illustrated in Fig. 2. The peripheral score 3 not only provides a means for defining and determining the location of the plane of fracture between adjacent bricks, but also provides the decorative recess between adjacent bricks when laid up in the wall, as most clearly illustrated in Fig. 6. After the slab has been formed as illustrated in Fig. 1, the same is broken apart, as illustrated in Fig. 2, so that each of the bricks 1 and 2 is provided with a decorative broken stone face 4 which is so highly desirable in this form of building material. Instead of having the plane of fracture extending through the slab at right angles to its greatest dimension, it may be arranged as in Fig. 4 to define the plane of fracture as extending through the slab parallel to its greatest dimension so that the bricks 5 and 6 will have their flat faces provided with a broken stone finish instead of their side or end faces as resulting from the arrangement of the score as illustrated in the previous figures.

When it becomes necessary to provide bricks which have decorative faces both on the sides and ends, as is necessary when a corner of the wall is constructed, such bricks may be obtained by having the slab formed similarly to the construction illustrated in Fig. 1, but in addition thereto being provided with longitudinally extending projections 7 and 8 which are separated from the body of the slab by scores 9, so that these sections may be broken off from the bricks 10 and 12 either before or after such bricks have been separated along the plane of fracture defined by the peripheral score 13. In this manner the bricks 10 and 12 will have decorative faces both on the side and end. Where the particular construction of the parts employed in the manufacture of the blocks comprising my invention permits relatively large slabs to be formed, it may be advisable and expedient to form a slab such as is illustrated in Fig. 5. In this particular form of construction, the slab when formed will be of sufficient volume so that when broken up or fractured, four bricks such as 14 will result. This particular form of slab has intersecting scores 15 and 16 which define the intersecting planes of fracture which are further defined and the breaking apart of the bricks facilitated by an aperture such as 17 extending transversely of the slab at the intersection of such scores. Formation of this aperture 17 will obviate all possibility of the inner corners of the bricks 14 breaking off unevenly as might be the case if such aperture were not provided.

As above indicated, it may be desirable in a number of cases to make a brick which has, in addition to its rough stone decorative face, a face which is of a different color than the material from which the body of the brick is made, and in order to insure that such face will be permanent and retain its color when exposed to the elements, it is desirable to provide such colored decorative face by means of a separate material which inherently possesses such colors.

The method comprising my invention may be employed advantageously in the manufacture of such bricks as is most clearly illustrated in Figs. 7 and 11. In this particular form of carrying out my invention, the slab, whether it be of the form illustrated in Fig. 1 or of any of the forms such as are illustrated in Figs. 3, 4 and 5, is provided with alternate layers of different materials such as 18, 19 and 20. When the different materials are arranged as illustrated in Fig. 7, the peripheral score 21 will define the plane of fracture extending transversely of the slab and lying wholly within one of the layers of such material, preferably the layer of so-called veneer. Then, when the bricks are broken apart, as illustrated in Fig. 2, the veneer material, i. e., the material comprising the layer 19, will be split so that approximately half lies on the face of each brick which will produce a highly decorative and durable block.

The above described forms of bricks may be made in the manner about to be explained, although it is to be noted that a number of other means than those specifically described may be employed in the manufacture of this novel product. The mechanism illustrated in Fig. 8 is most particularly adapted to the manufacture of bricks which are usually termed sand-lime bricks and consists of a reciprocating plunger 22 which moves in a guide 23 which is in the form of a mold box defining the lateral extent of the slab 24 formed therein. The top and bottom plates 25 of the mold may be formed with transversely extending ridges 26 which will secure the slab 24 as at 3 in Fig. 1. Likewise the lateral walls of the mold cavity may be provided with vertically arranged inwardly directed projections which will score the lateral faces of the slab in the desired manner. It is believed that the remainder of the apparatus illustrated in Fig. 8 is so well known to those familiar with the art of brick manufacture that a further description thereof is unnecessary for a full understanding of this invention.

Figs. 9 and 10 show apparatus which is specifically designed to be used in connection with the manufacture of bricks such as are illustrated in the previous figures and which are made of clay or like material in contradistinction to sand-lime as the material which is employed in connection with the apparatus illustrated in Fig. 8. In this particular form of apparatus, a mold box 27 is employed which has side members 28 and end members 29, said end members being preferably provided with inwardly directed projections 30 which form the necessary score on the ends of the slab. The mold 27 is supported in a suitable table 31 and disposed intermediately of opposing plungers or pistons 32 which carry plates 33 which are likewise provided with oppositely directed projections 34 which form the scores on the top and bottom of the slab 35 which is formed in this apparatus. In connection with the above described apparatus it will be noted that the particular form of the mold box and top and bottom plates will conform specifically in the arrangement of the projections to the type of slab which is to be formed such as those which have been described in Figs. 1 to 5, inclusive.

In connection with the implement of the above described apparatus for making sand-lime and clay bricks, it will be noted that when a suitable fitting apparatus is employed in connection with the apparatus illustrated in Fig. 8, such apparatus may be advantageously employed in the manufacture of clay bricks and when provided with such feeding apparatus, may be superior in certain respects to the apparatus illustrated in Figs. 9 and 10. However, regardless of the apparatus which is employed in the manufacture of either type of brick, whether sand-lime or clay, it will be noted that the sand-lime bricks will preferably be fractured or broken apart along the plane defined by the scores after such bricks have been cured, so that a hardened face will result, which face is capable of withstanding either the weathering to which it is subjected when installed in a wall, or the impact and wear to which it is subjected when the same is used as a paving block, either in a roadway or a wall. The manufacture of the clay product is slightly different from the sand-lime product in that the clay product will be broken along the scores before the same are fired or burned, so that the broken face will be vitrified and hardened in order to withstand the subsequent wear. Also, the firing of the broken face will give to such face the desirable flash which will take place while such bricks are burned.

When a brick of the class, such as is most clearly illustrated in Fig. 7, is to be made, the mold cavity 36 is first filled with alternately arranged layers 37, 38 and 39 of different materials, such materials being maintained separate during the filling operation by movable guides 40 which reciprocably extend into the mold cavity during the filling operation and which are withdrawn as soon as the mold is filled and before the same is rotated into the pressing position, such as is illustrated in Fig. 8. Obviously the sides and end plates of the mold cavity will be formed with the necessary projections so as to produce the peripheral score 21 on the finished slab such as is illustrated in Fig. 7. It will be understood in connection with the manufacture of this last described form of brick, that by a simple rearrangement of the partition members 40 as they are introduced to the molds, the veneer material such as the layer 19 in Fig. 7 may be positioned on opposite sides of the intersecting scores, as illustrated in Fig. 5, so that when such slab is formed, both the sides and end of the brick will be provided with a broken stone veneered finish.

It is believed that a further description of the principles comprising my invention is unnecessary for those familiar with the art of brick manufacture. Suffice it to say that numerous changes may be made in the specific embodiment of my invention which has been chosen for purposes of illustration without departing from the spirit thereof.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. The process of forming brick comprising molding a mass of suitable material with intersecting scorings on at least one face and an aperture extending therethrough at the intersection of said scorings, and then fracturing such mass along the lines of such scorings.

2. The process of forming brick comprising molding a mass of suitable material with intersecting scorings on opposite faces and an aperture extending therethrough joining the intersections of such scorings, and then fracturing such mass along the lines of such scorings.

Signed by me, this 29th day of September, 1930.

ROBERT B. STUCKEY.